United States Patent [19]

Taylor

[11] Patent Number: 4,610,184

[45] Date of Patent: Sep. 9, 1986

[54] INFINITELY VARIABLE TRANSMISSION

[76] Inventor: Paul Taylor, 907A Lotus La., Wausau, Wis. 54401

[21] Appl. No.: 517,016

[22] Filed: Jul. 25, 1983

[51] Int. Cl.[4] .......................... F16H 3/44; F16H 57/10
[52] U.S. Cl. ........................................ 74/794; 74/785; 74/786; 74/751
[58] Field of Search .......... 74/793, 794, 796, 786–788, 74/785, 751, 752 R

[56] References Cited

U.S. PATENT DOCUMENTS

| | | | |
|---|---|---|---|
| 1,190,278 | 7/1916 | Foote | 74/797 |
| 1,320,530 | 11/1919 | Buehler | 74/801 |
| 1,752,385 | 4/1930 | Johnson | 74/794 |
| 1,763,023 | 6/1930 | Tyler | 254/344 |
| 1,998,891 | 4/1935 | Benson | 74/289 |
| 2,218,838 | 10/1940 | Alspaugh | 74/298 |
| 2,301,292 | 11/1942 | Krick | 74/794 X |
| 2,454,694 | 11/1948 | Grebb | 74/794 |
| 2,743,628 | 5/1956 | Scharaffa | 74/794 |
| 3,008,341 | 11/1961 | Cobb | 74/687 X |
| 3,008,355 | 11/1961 | Grudin | 74/801 |
| 3,163,056 | 12/1964 | Clarke | 74/793 X |
| 3,222,954 | 12/1965 | Wuertz | 74/801 |
| 3,320,830 | 5/1967 | Fowell | 74/687 X |
| 3,460,807 | 8/1969 | Prikhodko et al. | 254/185 |
| 3,511,113 | 5/1970 | Rheault | 74/794 |
| 4,142,426 | 3/1979 | Baranyi | 74/801 |
| 4,472,984 | 9/1984 | Cook | 74/793 X |

OTHER PUBLICATIONS

"Pneumatics and Hydraulics," Third Edition, Harry L. Stewart (Theodore Audel & Co., division of Howard W. Sams & Co., Inc., Indianapolis, Indiana) 1982.
"The How and Why of Mechanical Movements," Harry Walton (Popular Science Publishing Company, Inc., New York) 1968.

Primary Examiner—Kenneth J. Dorner
Assistant Examiner—Stephen B. Andrews
Attorney, Agent, or Firm—Peterson, Wicks, Nemer & Kamrath

[57] ABSTRACT

An infinitely variable transmission requiring no external controls is shown in its preferred embodiment of the present invention as including a power housing rotatably mounted on an input and an output shaft. The output shaft includes a planetary cage and planetary gears located in the interior of the power housing. The planetary gears are in gearing relation with a sun gear located on the input shaft in the interior of the power housing and also in gearing relation with a ring gear formed as part of the power housing. Lubricant is provided in the interior of the power housing. If the load is sufficient to cause slippage, the resistance of the load coupled to the input rotation causes the power housing to rotate in a direction opposite to the direction of the input and output shafts when the output is initially accelerated. The internal resistance of the transmission created by the drag and friction of the drive, planetary, and ring gears gearing together and the viscosity of the lubricant influences the rotation and acceleration of the output. As the output load is accelerated and the input r.p.m. increases to a more constant level, overcoming initial load, the output load will decrease proportionately causing the power housing to decelerate. When the output load decreases to a point where there is less resistance to further accelerate the load than the internal resistance in the transmission, the output housing will cease rotation and begin rotating in the same direction as the direction of the input and output as the output is further accelerated.

9 Claims, 2 Drawing Figures

INFINITELY VARIABLE TRANSMISSION

BACKGROUND

This invention relates generally to transmissions, more particularly to infinitely variable transmissions, and specifically to infinitely variable transmissions requiring no external controls.

In the field of transmissions, a need has arisen for a transmission allowing the ratio between the input and output shafts to infinitely vary according to the rotational speed of the input shaft and the load on the output shaft. Further, such an infinitely variable transmission should allow the automatic selection of its own ratio in its range, based upon the input power, output load, and gear frictional resistance, and without the use of external members such as gear shifting members and the like. Additionally, such an infinitely variable transmission should have little power drag when the transmission is in direct drive.

SUMMARY

The present invention solves the above and other needs by providing, in the preferred embodiment, an infinitely variable transmission having a power housing into which an input and an output extend. The output includes a planetary gear which is parallel to but spaced from the input and output transmission axes. The planetary gear is in gearing relation between a drive gear located on the input and a ring gear located in the interior of the power housing. The transmission has an internal resistance created by the drag and friction of the gears and the viscosity of the lubricant for influencing the rotation and acceleration of the output. If the load is sufficient, the power housing will rotate in a direction opposite the direction of the input and output when the output is initially accelerated and will cease rotation and rotate in the same direction as the direction of the input and output as the output is further rotated.

It is thus a primary object of the present invention to provide a novel infinitely variable transmission.

It is further an object of the present invention to provide such a novel infinitely variable transmission which is of simple construction.

It is further an object of the present invention to provide such a novel infinitely variable transmission which is variable in response to the rotational speed of the input shaft and the load on the output shaft.

It is further an object of the present invention to provide such a novel infinitely variable transmission which allows the automatic selection of the input/output rotational ratio.

It is further an object of the present invention to provide such a novel infinitely variable transmission which contains few parts, is small in size, and is easy to assemble.

It is further an object of the present invention to provide such a novel infinitely variable transmission having the ability to operate without any linkage or controls external of the transmission for influencing the input/output rotational ratio.

These and further objects and advantages of the present invention will become clearer in the light of the following description of an illustrative embodiment of this invention described in connection with the drawings.

DESCRIPTION OF THE DRAWINGS

The illustrative embodiment may best be described by reference to the accompanying drawings where.

Figure 1:
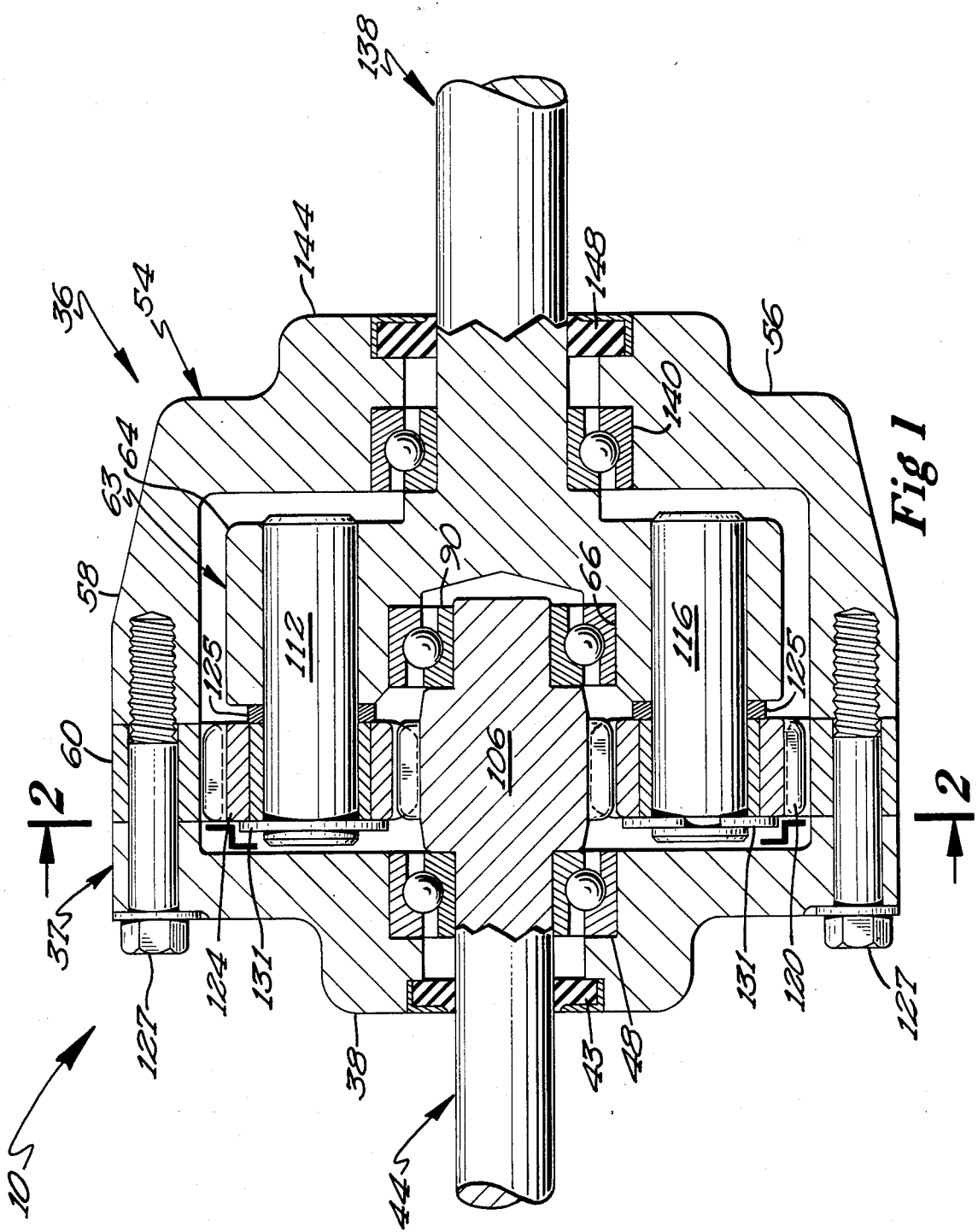
FIG. 1 shows a longitudinal sectional view through an infinitely variable transmission according to the teachings of the present invention.
Figure 2:
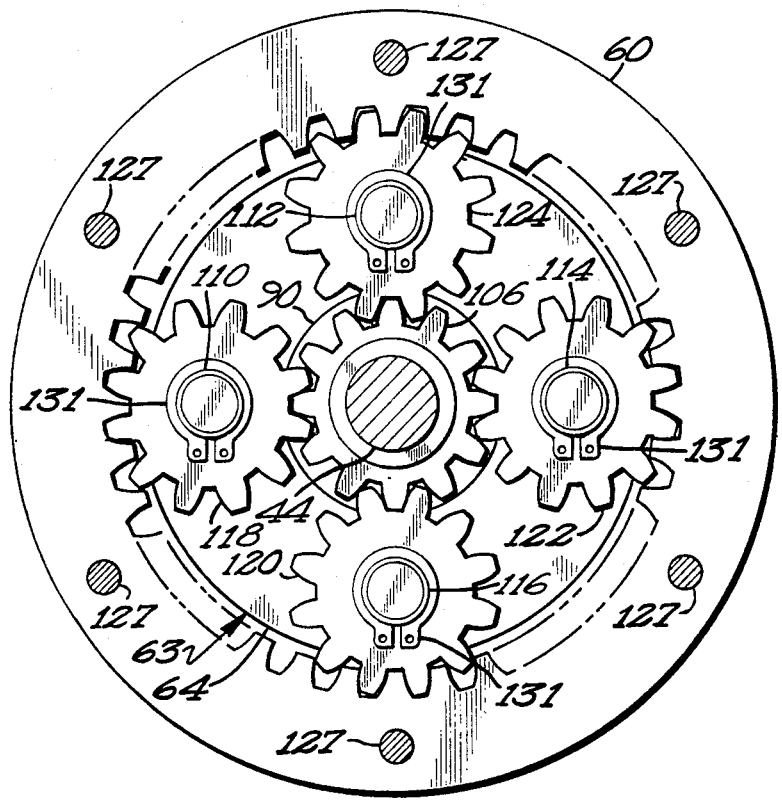
FIG. 2 shows a cross sectional view of the transmission of FIG. 1 according to section line 2—2 of FIG. 1.

All figures are drawn for ease of explanation of the basic teachings of the present invention only; the extension of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, gear ratio, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", and similar terms are used herein, it should be understood that these terms have reference only to the structure shown in the drawings as it would appear to a person viewing the drawings and are utilized only to facilitate describing the invention.

DESCRIPTION

An infinitely variable transmission according to the teachings of the present invention is shown in the drawings and generally designated 10. Infinitely variable transmission 10 includes a circular front power housing portion 37 having the hub portion 38. An input shaft 44 extends through hub portion 38 of the front power housing portion 37 and is mounted at one point in the bearing 48 mounted on shaft 44 and in hub 38 of the front input housing portion 37. Bearing 48 is in abutment with sun gear 106 fit on shaft 44. A sealing ring 43 is mounted in hub 38 and in sealing engagement with shaft 44.

The numeral 54 designates the rear power housing portion having the circular base portion 56 which terminates at its outer periphery in the annular wall portion 58. Interposed between the outer periphery of the housing portion 37 and the outer free end of the annular wall portion 58 of the rear output housing portion 54 is the internal ring gear 60. The front output housing portion 37 is connected to the ring gear 60 and the rear output housing portion 54 by means of a series of spaced bolts 127. The power housing 36 includes the front output housing portion 37, the annular wall portion 58, the ring gear 60, and the base portion 56. Due to the circular shape of portion 36 and base portion 56 and the cylindrical shape of portion 58 and gear 60, power housing 36 is dynamically balanced about the axis of input shaft 44, output shaft 138, and transmission 10.

Further provided is the planetary cage 63 mounted in the interior of power housing 36 and which includes the circular body portion 64 which has formed therein the axial bore 66. The front planetary cage 63 is rotatably mounted on the shaft 44 by means of bearing 90 fit in axial bore 66 formed in the body portion 64 of cage 63 and fit on shaft 44 in abutment with sun gear 106 fit on shaft 44. Thus, gear 106 is held longitudinally stationary in transmission 10 by bearings 48 and 90 which abut with gear 106.

Additionally provided are the series of four spaced pins 110, 112, 114, and 116 secured, such as by press fitting, in the body portion 64 of cage 63, each of which is radially outward of the axis of the circular base portion 56 and equidistant from the axis thereof. Mounted on the pins 110–116 are the planetary gears 118, 120, 122, and 124, respectively. All of the planetary gears 118–124 mesh with the sun gear 106 and the ring gear 60 of power housing portion 36. Further provided are shims 125 located on pins 110–116 in rotational abutment between circular body portion 64 of cage 63 and gears 118–124. C-clips 131 are further provided on pins 110–116 for retaining gears 118–124 thereon. Therefore, gears 118–124 are held longitudinally stationary in transmission 10 by shims 125 and C-clips 131 on pins 110–116 which abut therewith, and thus prevent end thrust on gears 118–124. It should then be noted that cage 63, pins 110–116, gears 118–124, and other related structure are dynamically balanced about the axis of input shaft 44, output shaft 138, and transmission 10.

The circular base portion 56 has formed therein the hub portion 144 through which extends the output shaft 138 formed integrally with and as part of the planetary cage 63. Ihe shaft 138 is rotatably mounted in the bearing 140 mounted in the hub portion 144 of the circular base portion 56 and on the shaft 138. The sealing ring 148 is mounted in hub portion 144 of circular base portion 56 in sealing contact with the shaft 138. Bearings 90 and 140 rotationally abut on opposite sides of cage 63 and thus hold cage 63 longitudinally stationary in transmission 10. Thus, since cage 63 and gear 106 are both held longitudinally stationary in transmission 10, both input shaft 44 and output shaft 138 are likewise held longitudinally stationary in housing 36 and transmission 10.

In its most preferred form, gears 106 and 118–124 each have 16 gear teeth and ring gear 60 has 48 gear teeth. Thus, when power housing 36 is rotationally stationary, the stationary power housing gear ratio between input shaft 44 and output shaft 138 is 4:1. It can then be appreciated that if power housing 36 were not allowed to rotate but was held stationary, transmission 10 would act as a gear reduction unit or speed reduction unit.

The output shaft 138 may be connected to a unit to be powered, for example, the differential of an automobile, and the input shaft 144 rotates by being connected to a source of power, for example, an automotive engine. The sealed power housing 36 is filled with lubricant. It can be appreciated that the lubrication will tend to spread evenly around the outer periphery of the interior of power housing 36 when power housing 36 is rotated by centrifugal force.

Now that the structure of the present invention has been set forth, the operation of transmission 10 and the subtle features thereof can be explained and appreciated. For the sake of example, it will be assumed that the output load is stationary and sufficient to cause transmission 10 to use its torque converter effect, which will be explained further hereinafter, so in the initial acceleration of the output load some of the rotational effort will be lost due to slippage. As power is applied to input shaft 44 and it rotates, sun gear 106 is rotated as well. Gear 106 in turn rotates planetary gears 118–124 which in turn rotate cage 63 and output shaft 138 in the same direction as the input rotation. Due to inertia, initially the load is greatest on the output shaft 138 and slippage occurs when planetary gears 118–124 also rotate internal ring gear 60 in a direction opposite to the input rotation. Since ring gear 60 is part of the outer housing 36, outer housing 36 then rotates opposite to the input rotation. Thus, whenever the rotation of the power housing opposes the rotation of the input shaft 44, slippage or loss of rotational effort is occurring.

As output load is accelerated and input r.p.m. increases to a more constant level, overcoming initial load, then output load will decrease proportionately. The opposing rotation of power housing 36 will then begin to decelerate in a manner inversely synchronous with the continued acceleration of output shaft 138 and the output load. When the output load decreases to the point where there is less resistance to further accelerate the load than internal resistance in transmission 10, the power housing 36 will stop rotating and become stationary. At this point, unlike a torque converter, slippage has ceased to occur. Thus, input rotational effort is not lost and the transmission has reached its greatest amount of gear or speed reduction, without slippage, in the preferred embodiment a ratio of 4:1. It should then be appreciated that power is still of course lost due to drag and friction in transmission 10.

As output shaft 138 is further accelerated, power housing 36 begins to rotate in the same direction as input shaft 44 and output shaft 138 and also accelerates as does the output shaft 138. It should then be noted that the reversal of rotation from a direction opposite to input and output shafts 44 and 138, to a stationary position, and to a rotational direction the same as rotational shafts 44 and 138 is instantaneous, with output shaft 138 continuing to accelerate without hesitation.

It should then be appreciated that as power housing 36 accelerates in the same direction as output shaft 138, the gear reduction continues from the gear reduction when the output housing was stationary, in the preferred embodiment a ratio of 4:1, infinitely until the output load is rotating nearly at the same speed as the input load of the power source, or in other words, when the ratio of 1:1 is reached or in direct drive. A 1:1 ratio could only be achieved with a load of zero and could be reached only at a point of perfect balance between load and reversal of load. In direct drive, transmission 10 would rotate as a single unit around the transmission axis and act as a "fly wheel" with no internal resistance, thus achieving high efficiency. It should be noted that this "fly wheel" effect with reduced internal resistance and greater efficiency is also achieved even though a 1:1 ratio is not reached.

Assuming output shaft 138 has been accelerated and is rotating at a constant speed, if a greater load is placed on output shaft 138, further power would be necessary to drive the output shaft 138. As greater load is placed on output shaft 138, power housing 36 decelerates and thus the gear ratio begins dropping. If the gear ratio drops past the stationary power housing gear ratio, in the preferred embodiment of the present invention, past the 4:1 ratio, the outer housing would be stationary for an instant and then begin rotating in a direction opposite of the input and output rotations. It should then be appreciated that slippage then begins when the outer housing rotates in a direction opposite of the input and output shafts 44 and 138. In fact, if the load is sufficient, the ratio may drop to 1:0; hence, the output rotation has ceased and total slippage results, thus providing the torque converter effect. If the load is now decreased, or if the input rotation is increased sufficiently, the output load would then begin rotating and accelerating as described hereinbefore.

It can then be appreciated that the load of the output shaft 138 may be sufficient such that the input rotational power of shaft 44 can only accelerate shaft 138 to a ratio less than direct drive, such as a ratio of 2:1. It can then be further appreciated that with no fluctuations in input power or speed, output load, or the internal or external resistance on transmission 10, the gear ratio between input shaft 44 and output shaft 138 will remain at the 2:1 ratio. However, if any of these factors fluctuate, the gear ratio will vary a corresponding amount.

Assuming no external controls are provided for transmission 10, output shaft 138 may overrun input shaft 44. Overrun can occur in several occasions, such as in the event of reversal of the load force, if the input shaft 44 is stationary but the load on output shaft 138 is rotated, and the like. In the case of overrun, output shaft 138 will carry power housing 36 with it as a function of gears 60 and 118-124 at a rate dependent on the particular gear ratios of transmission 10. For example, in the preferred embodiment of the present invention, power housing 36 will rotate 1⅓ revolutions for every revolution output shaft 138 overruns input shaft 44.

It should be noted that whether the input can drive the output without slippage of power housing 36 occurring, i.e., rotation in a direction opposite the rotation direction of the input and output, and the rate of acceleration depend on the internal resistance of transmission 10, input rotational speed, and amount of output load. Since internal resistance is a working part of transmission 10, it will need adjustment. For example, the number, size, width, and type of gears, tolerances, and lubricant amount and viscosity, and various other factors all will vary resistance and can be used to match the application. Furthermore, the internal resistance of transmission 10 varies with the operation of transmission 10. For example, the internal resistance in transmission 10 is directly related to the difference in rotational speed between the input shaft 44 and output shaft 138 due to gear drag and friction.

It can then be appreciated that transmission 10 has several advantages over conventional transmissions. First, transmission 10 is of a very simple design requiring fewer parts, of a smaller size, and easier to manufacture. Furthermore, transmission 10 is able to run at the correct or near correct ratio of input and output as a function of the input r.p.m. and torque, output load, the internal resistance of transmission 10, and the inertial forces of the drive train and load. Thus, the infinitely variable transmission 10 of the present invention allows the automatic selection of the gear ratio. Therefore, greater efficiency results because the source of power is able to operate at its most efficient speed under normal conditions. Furthermore, due to the infinite ratios available, transmission 10 is better able to keep the engine in a more efficient torque and r.p.m. range under normal conditions. Further, transmission 10 does not require any external controls to influence the gear ratio such that gear linkages and the like are not in any way required.

Furthermore, although transmission 10 has the ability to operate without any external controls for influencing the input/output rotational ratio, it may be desireable to provide external influence such as if the internal resistance is insufficient to initially rotate the output load to the stationary power housing ratio, to prevent the output from overriding the input, or to brake the output load to the stationary power housing ratio. One method of external influence is to control the rotation of power housing 36. For example, suitable braking apparatuses can be provided to selectively reduce the rate of rotation and/or to selectively prevent the rotation of power housing 36 in a direction opposite to the rotation direction of the input or output.

Now that the basic teachings of the present invention have been explained, many extensions and variations will be obvious to one having ordinary skill in the art. For example, gears 60, 106, and 118-124 can be designed to obtain other gear ratios than the gear ratios set forth for the preferred embodiment of the present invention.

Additionally, gears 60, 106, and 118-124 are shown in their preferred forms and are believed to be particularly advantageous; however, other gear forms can be utilized such as two-step planetary cluster gears in substitution for and/or in addition to gears 60, 106, and 118-124 according to the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Infinitely variable transmission having no external controls comprising, in combination: a rotatable input; a rotatable output, with the input and output lying along and being dynamically balanced along a transmission axis; a power housing having an interior; means for rotatably mounting the power housing on the input about the transmission axis; means for rotatably mounting the power housing on the output about the transmission axis, with the power housing being dynamically balanced along the transmission axis; a drive gear located in the interior of the power housing and operatively attached to the input along the transmission axis; at least a first, planetary gear located in the interior of the power housing and operatively attached to the output along a planetary gear axis which is parallel to but spaced from the transmission axis, with the planetary gear being in gearing relation with the drive gear; a ring gear located in the interior of and operatively attached to the power housing along the transmission axis, with the ring gear being in gearing relation with the planetary gear; a lubricant having a viscosity located in the interior of the power housing, with the transmission having an internal resistance created by the drag and friction of the drive, planetary, and ring gears gearing together and the viscosity of the lubricant for influencing the rotation and acceleration of the output, wherein if the load is sufficient, the power housing will rotate in a direction opposite to the direction of the input and output when the output is initially accelerated and will cease rotation and begin rotating in the same direction as the direction of the input and output as the output is further accelerated.

2. The transmission of claim 1 further comprising, in combination: a second planetary gear located in the interior of the power housing and operatively attached to the output along a planetary gear axis which is parallel to but spaced from the transmission axis, with the second planetary gear being in gearing relation with the drive gear, with the ring gear being in gearing relation with the second planetary gear, with the first and second planetary gears being operatively attached to the output by a planetary cage, with the first and second planetary gears being on opposite sides of the transmission axis to dynamically balance the planetary gears along the transmission axis.

3. The transmission of claim 2 further comprising, in combination: means for rotatably mounting the output on the input.

4. The transmission of claim 2 wherein the input comprises a shaft connected to a source of power, wherein the output comprises a shaft, and wherein the drive gear comprises a sun gear carried by the input shaft.

5. The transmission of claim 1 wherein the drive gear and the planetary gear each have sixteen gear teeth and wherein the ring gear has forty-eight gear teeth such that the power housing ceases to rotate when the ratio between the input and the output is 4:1.

6. The transmission of claim 1 wherein the power housing comprises, in combination: a circular front power housing portion having a hub portion; and a rear power housing portion having a circular base portion terminating in an annular wall portion having a free end, with the circular base portion having a hub portion; and means for connecting the front and rear housing portions together.

7. The transmission of claim 6 wherein the means for rotatably mounting the power housing on the input about the transmission axis comprises means for rotatably mounting the hub portion of the circular front power housing portion on the input about the transmission axis; and wherein the means for rotatably mounting the power housing on the output about the transmission axis comprises means for rotatably mounting the hub portion of the circular base portion of the rear power housing on the output about the transmission axis.

8. The transmission of claim 6 wherein the ring gear is operatively attached to the power housing by interposing the ring gear between the circular front power housing portion and the free end of the annular wall portion of the rear housing portion with the front and rear power housing portions connected together.

9. The transmission of claim 3 wherein the planetary gear is operatively attached to the output by a planetary cage, with the planetary cage including a circular body portion having an axial bore formed therein, with the means for rotatably mounting the output on the input comprising a bearing located on the input and within the axial bore of the planetary cage of the output.

* * * * *